(12) United States Patent
Shen et al.

(10) Patent No.: US 7,130,153 B2
(45) Date of Patent: Oct. 31, 2006

(54) STITCHED WRITE HEAD WITH STAIRCASE P2 DEFINED THROAT HEIGHT

(75) Inventors: Yong Shen, Saratoga, CA (US); Sue S. Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 137 days.

(21) Appl. No.: 10/675,736

(22) Filed: Sep. 29, 2003

(65) Prior Publication Data
US 2005/0068677 A1 Mar. 31, 2005

(51) Int. Cl.
G11B 5/147 (2006.01)
(52) U.S. Cl. .................................... 360/126
(58) Field of Classification Search ................. 360/126
See application file for complete search history.

(56) References Cited

U.S. PATENT DOCUMENTS

| 6,029,339 A | 2/2000 | Chang et al. ............ 29/603.14 |
| 6,282,056 B1 | 8/2001 | Feng et al. ................. 360/126 |
| 6,337,783 B1 | 1/2002 | Santini ....................... 360/317 |
| 6,353,511 B1 | 3/2002 | Shi et al. .................... 360/126 |
| 6,643,095 B1 * | 11/2003 | Sasaki ......................... 360/126 |
| 6,885,519 B1 * | 4/2005 | Sasaki ......................... 360/126 |
| 6,898,057 B1 * | 5/2005 | Okai et al. .................. 360/126 |
| 2002/0026705 A1 | 3/2002 | Santini ..................... 29/603.12 |

* cited by examiner

Primary Examiner—A. J. Heinz
(74) Attorney, Agent, or Firm—Ervin F. Johnston (57) ABSTRACT

A magnetic write head assembly has a head surface and a track width at the head surface wherein the head surface forms a first vertical plane and wherein the head assembly includes first and second pole pieces, a write gap located between the first and second pole pieces, the second pole piece having first and second components wherein the first component is located between the write gap and the second component and each of the first and second components has a height into the head which extends from and which is oriented perpendicular to said head surface, the first component having a uniform thickness throughout its height into the head with the height into the head forming a zero throat (ZTH) which lies in a second vertical plane that is parallel to said first vertical plane, the height into the head of the second component being greater than the height into the head of the first component, and each of the first and second components having said track width at the head surface.

6 Claims, 9 Drawing Sheets

STITCHED WRITE HEAD WITH STAIRCASE P2 DEFINED THROAT HEIGHT

BACKGROUND OF THE INVENTION

1. Field of the Invention

The present invention relates to a stitched write head with a staircase defined second pole piece (P2) throat height and, more particularly, to such a write head and method of making wherein a first component of P2 can be fabricated on a planar surface for defining the throat height and a second component of P2 can be fabricated on a planar surface including the first component with a track width so that the second component can be employed as a mask for ion milling the first component with the track width.

2. Description of the Related Art

The heart of a computer is a magnetic disk drive which includes a rotating magnetic disk, a slider that has a magnetic head assembly which includes write and read heads, a suspension arm. When the disk is not rotating the actuator arm parks the suspension arm on a ramp. When the disk rotates and the slider is positioned by the arm above the disk air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where signal fields are written and read by the write and read heads. The write and read heads are connected to processing circuitry that operates according to a computer program to implement the writing and reading functions.

A write head typically employs ferromagnetic first and second pole pieces which are capable of carrying flux signals for the purpose of writing signal fields into a track on a magnetic medium, such as a rotating magnetic disk. Each of the first and second pole pieces has a yoke region which is located between a pole tip region and a back gap region. The pole tip region is located at the ABS and the back gap region is spaced from the pole tip region at a recessed location within the write head. At least one coil layer is embedded in an insulation stack which is located between the first and second pole pieces in the yoke region. A nonmagnetic write gap layer is located between the pole tips of the first and second pole pieces and the first and second pole pieces are magnetically connected at the back gap. Processing circuitry digitally energizes the write coil which induces flux into the first and second pole pieces so that flux signals bridge across the write gap at the ABS to write the aforementioned signal field or magnetized bits into the track of the rotating disk.

A write head is typically rated by its areal density which is a product of its linear bit density and its track width density. The linear bit density is the number of bits which can be written per linear inch along the track of a rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the thickness of the write gap layer, pole materials, throat height, flight height and media characteristics. The track width density is directly dependent upon the width of the second pole tip at the ABS. Efforts over the years to increase the areal density has resulted in increased computer storage capacities over the past few decades.

The throat height of a write head plays a key role in obtaining a desirable BPI. The throat height of a write head is the distance from the ABS to a recessed location within the head where the first and second pole pieces first commence to separate after the ABS. The recessed location is referred to in the art as the zero throat height (ZTH). As write gap and flight height is decreased, the short throat height length is required to render high efficiencies with sufficient write field and field gradient for linear bit definition. The tolerance control of throat height variation is critical for a short throat height writer to ensure consistent writer performance and device yield. In order to achieve superior tolerance control, a planar surface is greatly preferred for the photolithographic process which defines zero throat position.

Another aspect in the construction of high areal density write heads is the track width density of the head. The track width density depends upon the distance between the first and second side walls of the second pole piece. Frame plating is typically employed to fabricate the second pole tip which is defined by a photolithographic pattern prior to plating. When the second pole tip is a separate component of the second pole piece, which is fabricated before the fabrication of the yoke portion of the second pole piece, the first and second side surfaces of the second pole tip can be well-defined.

A typical design is to employ a first pole piece (P1) pedestal for defining the throat height. In order to achieve required magnetic performance, however, the throat height of the pedestal must be long (1.0 µm–2 µm) so that the P1 pedestal is not over-saturated causing a low write efficiency for a writer with narrow write gap and track width. Another scheme for achieving the throat height is to fabricate a first component of the second pole piece over a resist bump. The resist bump elevates the first component so as to define the throat height. Unfortunately, the resist bump creates a nonplanar structure near the ABS which makes it difficult to fabricate a precise track width during the photo/trim patterning process. Accordingly, there is a strong-felt need to fabricate a write head with a precise zero throat height so as to optimize the BTI and the TPI as well as fabricating a precise and narrow track width so as to maximize the TPI.

SUMMARY OF THE INVENTION

The present invention provides a precisely defined throat height along with a well-formed narrow track width. In one aspect of the invention the zero throat height is defined by a first component of the second pole piece which has a precisely defined vertical back edge as close as possible to the ABS for maximizing the BPI without unduly impacting the TPI. Another aspect of the invention is to fabricate this first component on a planar surface. During fabrication the width of the first component may be greater than the track width. A further aspect is to planarize the head assembly with the throat defining first component and then fabricate a second component of the second pole piece upon this planar surface so that a very narrow well-defined track width can be formed. A still further aspect of the invention is to employ the second component as a mask while the first component is ion milled so that the first component is also defined with the track width. In one embodiment of the invention the second pole piece has a third component which is a second pole piece layer which is stitched to the second component and is connected to the first pole piece at a back gap. The second pole piece layer has a front edge which is typically recessed from the ABS. It is important that there be sufficient stitching so that there is a proper flux transfer between the second pole piece layer and the first component. This has been achieved by providing the second component with a height which is greater than the throat height of the first component which height is located between the throat height and the first coil layer. With this arrangement there can be sufficient stitching between the second component and the second pole piece layer so that the components are not over-saturated.

In a method of the invention a first pole piece layer of a first pole piece is formed with a pole tip portion, a back gap portion which is recessed from the head surface and a yoke portion which is located between the pole tip and back gap portions, an insulation stack with at least one coil layer embedded therein is formed on the yoke portion of the first pole piece layer, a pedestal of the first pole piece is formed on the pole tip portion of the first pole piece layer, a write gap layer is formed on the pedestal, a first component of a second pole piece is formed on the write gap layer with a width at the head surface which is greater than the track width and with a zero throat that extends from the head surface into the head assembly where the first and second pole pieces first commence to separate after the head surface, the second component of the second pole piece is formed on the first component with the track width and the second component is employed as a mask for ion milling the first component to define the first component with the track width.

Other aspects and attendant advantages of the invention will be appreciated upon reading the following description taken together with the accompanying drawings wherein the various figures are not to scale with respect to one another nor are they to scale with respect to the actual embodiments depicted therein.

DESCRIPTION OF THE PREFERRED EMBODIMENTS

Magnetic Disk Drive

Figures 1, 2:
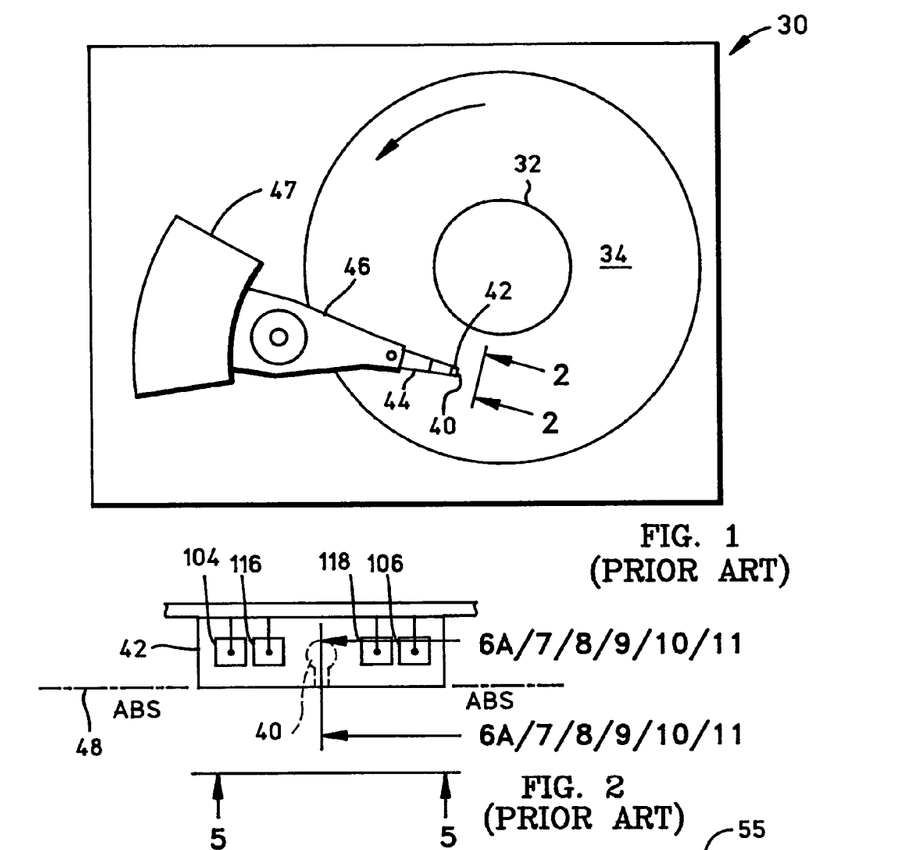
FIG. 1 is a plan view of an exemplary prior art magnetic disk drive.
FIG. 2 is an end view of a prior art slider with a magnetic head of the disk drive as seen in plane 2—2 of FIG. 1.
Figure 3:
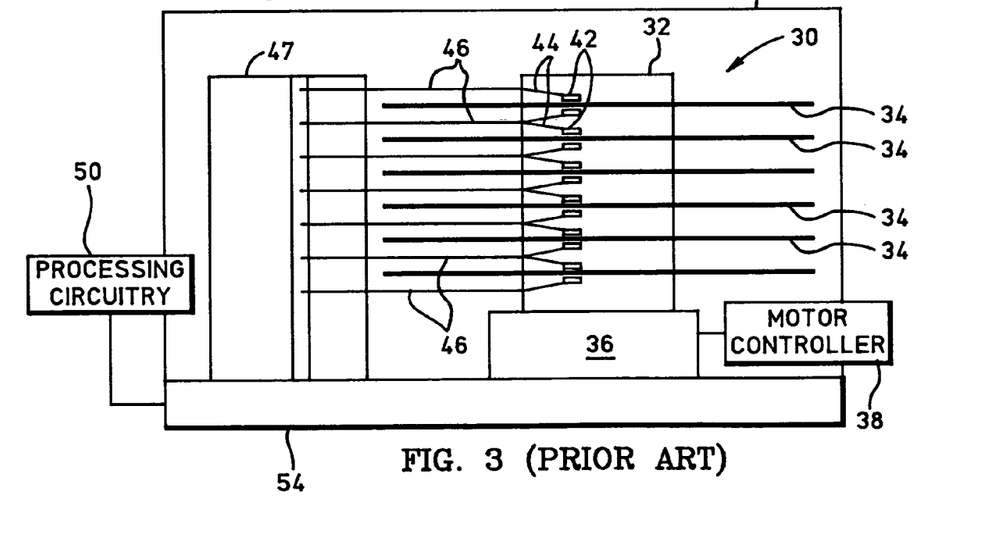
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
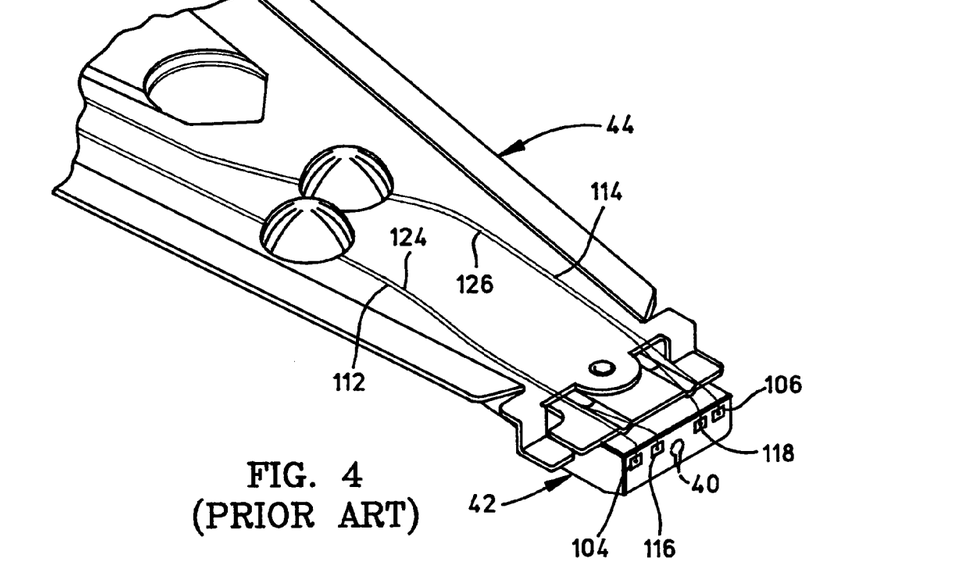
FIG. 4 is an isometric illustration of an exemplary prior art suspension system for supporting the slider and magnetic head.

When the disk 34 is rotated by the spindle motor 36 the slider is supported on a thin cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
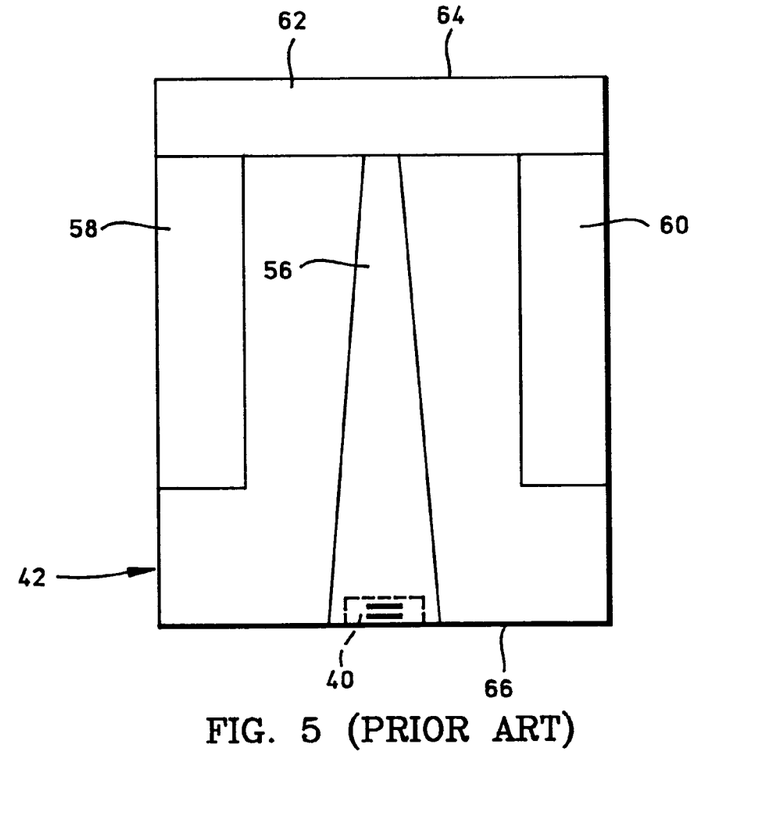
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6A:
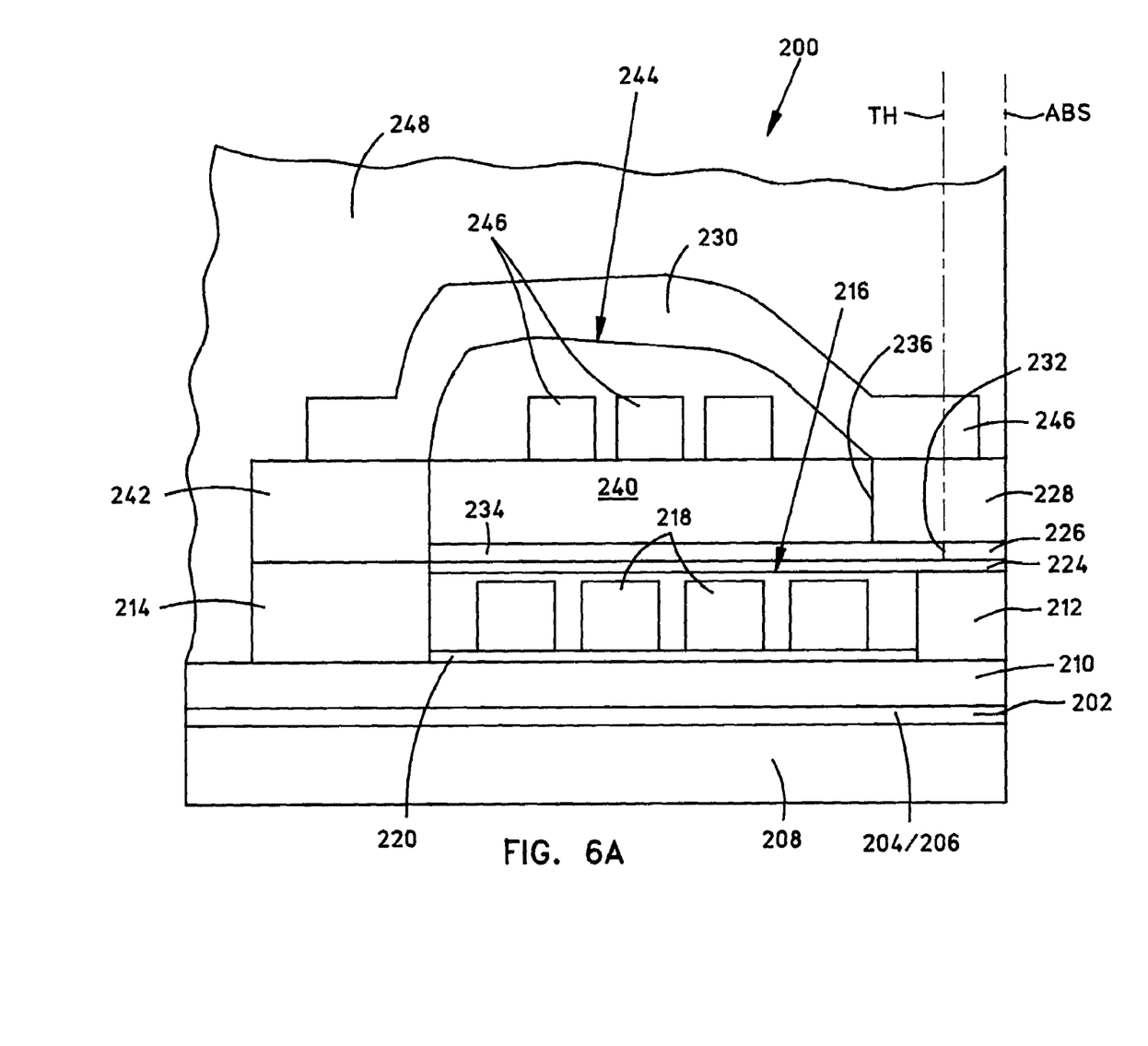
FIG. 6A is a longitudinal cross-section of a magnetic write and read head assembly taken along plane 6A—6A of FIG. 2.

FIG. 6A is a side cross-sectional elevation view of a magnetic head assembly 200, which includes a write head portion and a read head portion and is a first embodiment of the magnetic head assembly 40 in FIG. 2. In the read head a sensor 202 is sandwiched between nonmagnetic electrically insulative first and second read gap layers 204 and 206, and the read gap layers are sandwiched between ferromagnetic first and second shield layers 208 and 210. In response to external magnetic fields, the resistance of the sensor 202 changes. A sense current Is (not shown) conducted through the sensor causes these resistance changes to be manifested as potential changes. These potential changes are then processed as readback signals by the processing circuitry 50 shown in FIG. 3.

The write head portion includes first and second pole pieces wherein the first pole piece may also include the second shield layer 210 and a first pole piece pedestal 212. When the layer 210 serves as both a second shield layer for the read head and a first pole piece for the write head the magnetic head assembly 200 is referred to as a merged magnetic head assembly. In separate magnetic write and read head assemblies there is an isolation layer between the second shield layer and the first pole piece of the write head, commonly referred to in the art as a piggyback head.

The layer 210, which is a first pole piece layer of the write head, has a yoke portion which is located between a pole tip portion and a back gap portion. The pedestal 212 is mounted on the pole tip portion, a ferromagnetic first component of a back gap 214 is located on the back gap portion and an insulation stack 216 with a first write coil 218 is located on the yoke portion. The insulation stack 216 includes an insulation layer 220 which electrically isolates the write coil layer 218 from the first pole piece layer. A write gap layer 224 is located on the pedestal 212 and the insulation stack 216.

Figure 6B:
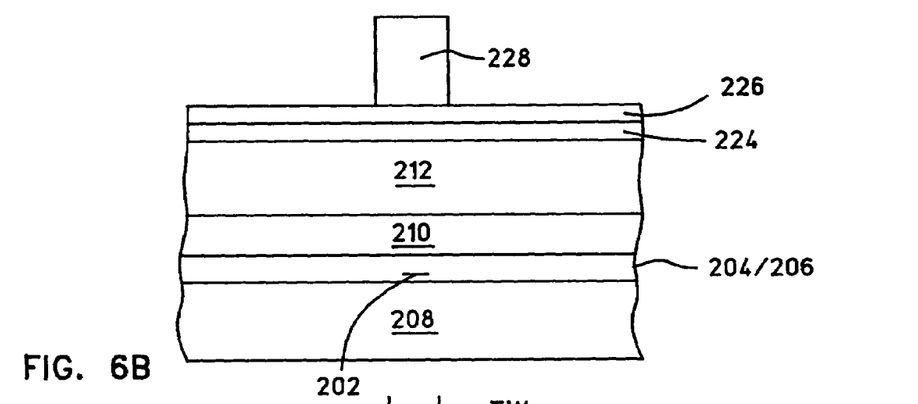
FIGS. 6B, 6C and 6D are ABS views of FIG. 6A showing various steps in the fabrication of the head assembly in FIG. 6A.

The second pole piece includes ferromagnetic first, second and third components 226, 228 and 230. The first component 226 is formed on the planar surface of the write gap layer 224 with a front edge at the ABS and a back vertical edge 232 which defines a throat height (TH) of the write head where the first and second pole pieces first commence to separate after the ABS. Because of the planar surface of the top of the write gap layer 224 the back edge 232 can be well-defined and accurately located. During fabrication the first component 226 may be a full-width layer, as shown in FIG. 6B, which extends beyond a desired track width of the write head. After fabricating the first component 226 a thick alumina layer is deposited and chemically mechanically polished (CMP) down to a top level of the first component 226 to form a layer 234 which, along with the component 226, provides a flat planar surface. As shown in FIG. 6A the second component 228 is fabricated so that it extends from the ABS to a back edge 236 which has a height into the head which is greater than the height of the edge 232. The second component 228 in FIG. 6B is higher and wider so that after ion milling in FIG. 6C the defined track width (TW) is achieved. This depth provides sufficient stitching area for the third component 230 so that magnetic flux can be properly transferred through the components. Because of the planar surface provided by the first component 226 and the layer 234 the second component 228 can be well-formed, as shown in Fig. 6B.

Figure 6C:
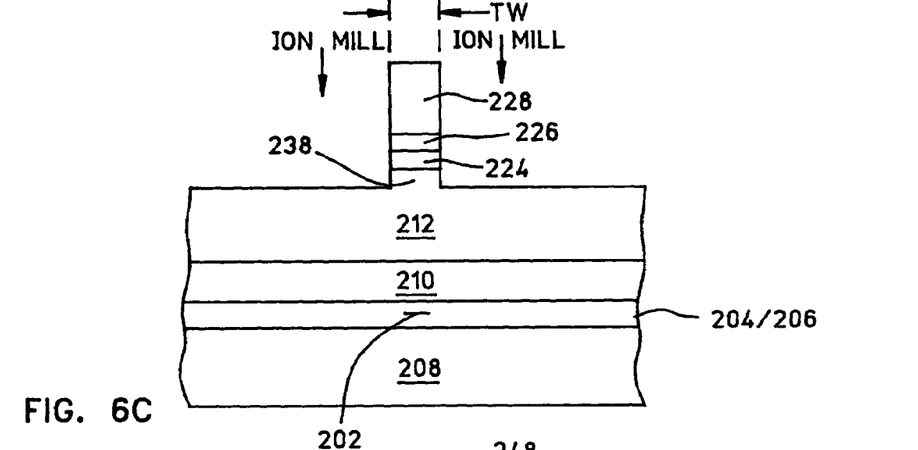
Figure 6D:
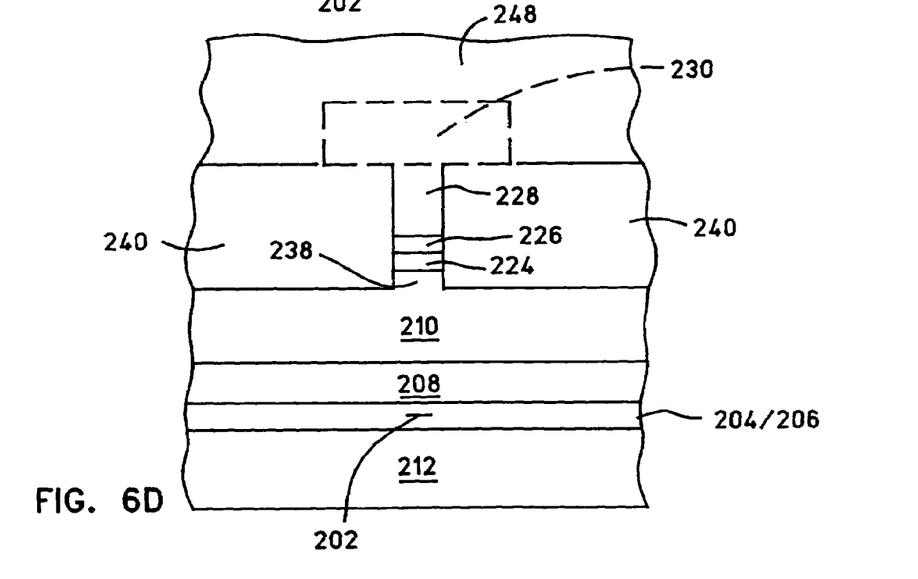

As shown in FIG. 6C ion milling may be implemented, employing the second component 228 as a mask, for defining the first and second components 226 and 228 with a track width (TW). An aspect of the invention is to continue this ion milling through the write gap layer 224 slightly into the pedestal 212 thereby notching the pedestal 212 to form a first pole piece cap 238 with the track width (TW). After constructing the second component 228 along with a second component 242 of the back gap a thick layer of alumina may be deposited and CMP to form a planarized insulation layer 240 as shown in FIGS. 6A and 6D. As shown in FIG. 6A a second insulation stack 244 with a write coil 246 embedded therein may then be fabricated on the layer 240 followed by fabrication of the third component 230 of the second pole piece which is stitched to the second component 228 of the second pole piece, which is extended over the insulation stack 244 and which is magnetically connected to the second component 242 of the back gap. A front end 246 of the third component is recessed from the ABS so as to minimize side writing by the write head as shown in FIGS. 6A and 6D. An overcoat layer 248 is then applied as shown in FIGS. 6A and 6D.

Figure 7:
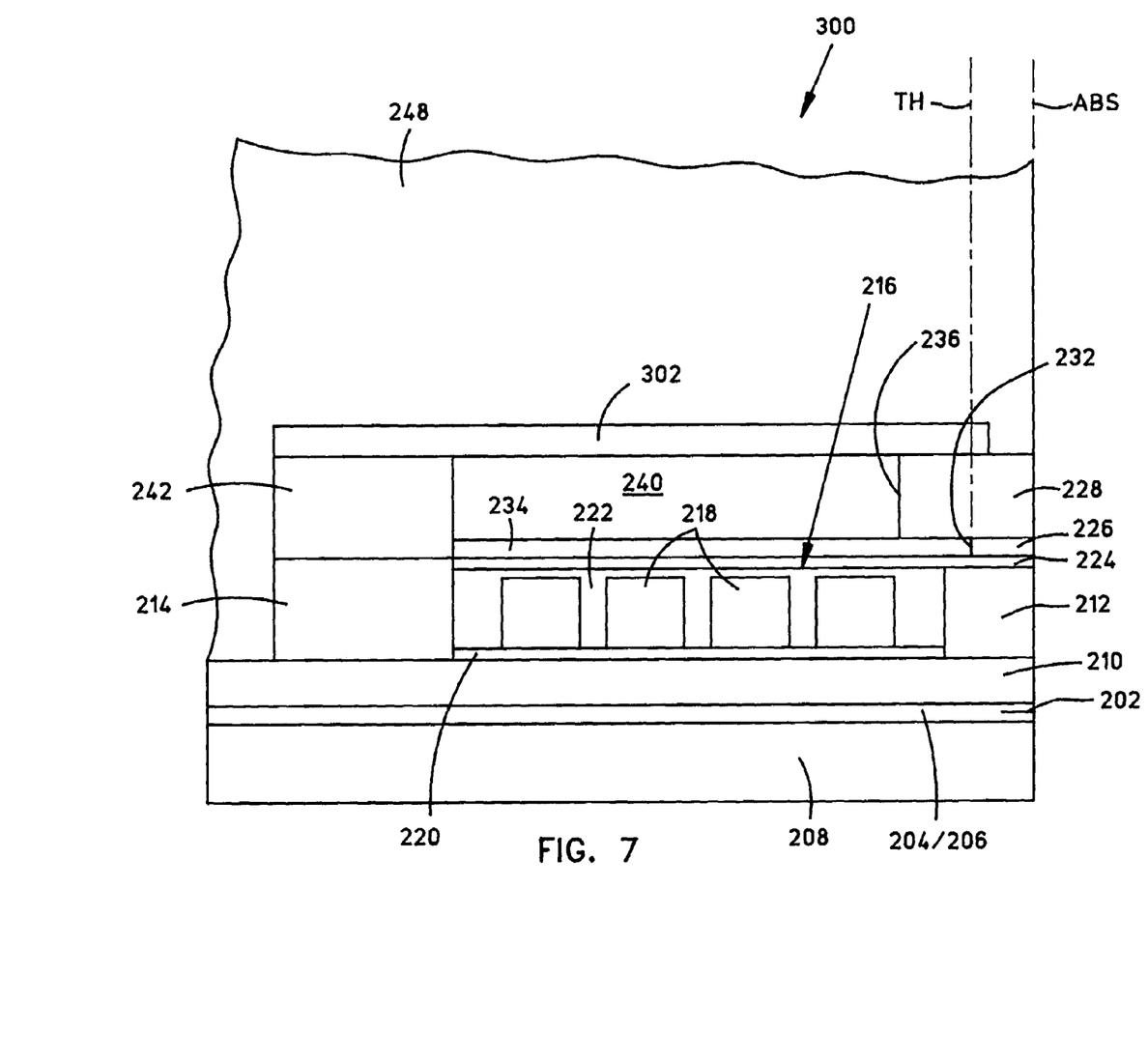
FIG. 7 is a longitudinal cross-sectional view through plane 7—7 of FIG. 2 of a second embodiment of the magnetic head assembly.

Another embodiment 300 of the magnetic head assembly is illustrated in FIG. 7 which is the same as the embodiment 200 in FIG. 6A except the second insulation stack 244 with the write coil in FIG. 6A has been eliminated and a third component 302 of the second pole piece is a flat layer instead of an arched layer 230 as shown in FIG. 6A.

Figure 8:
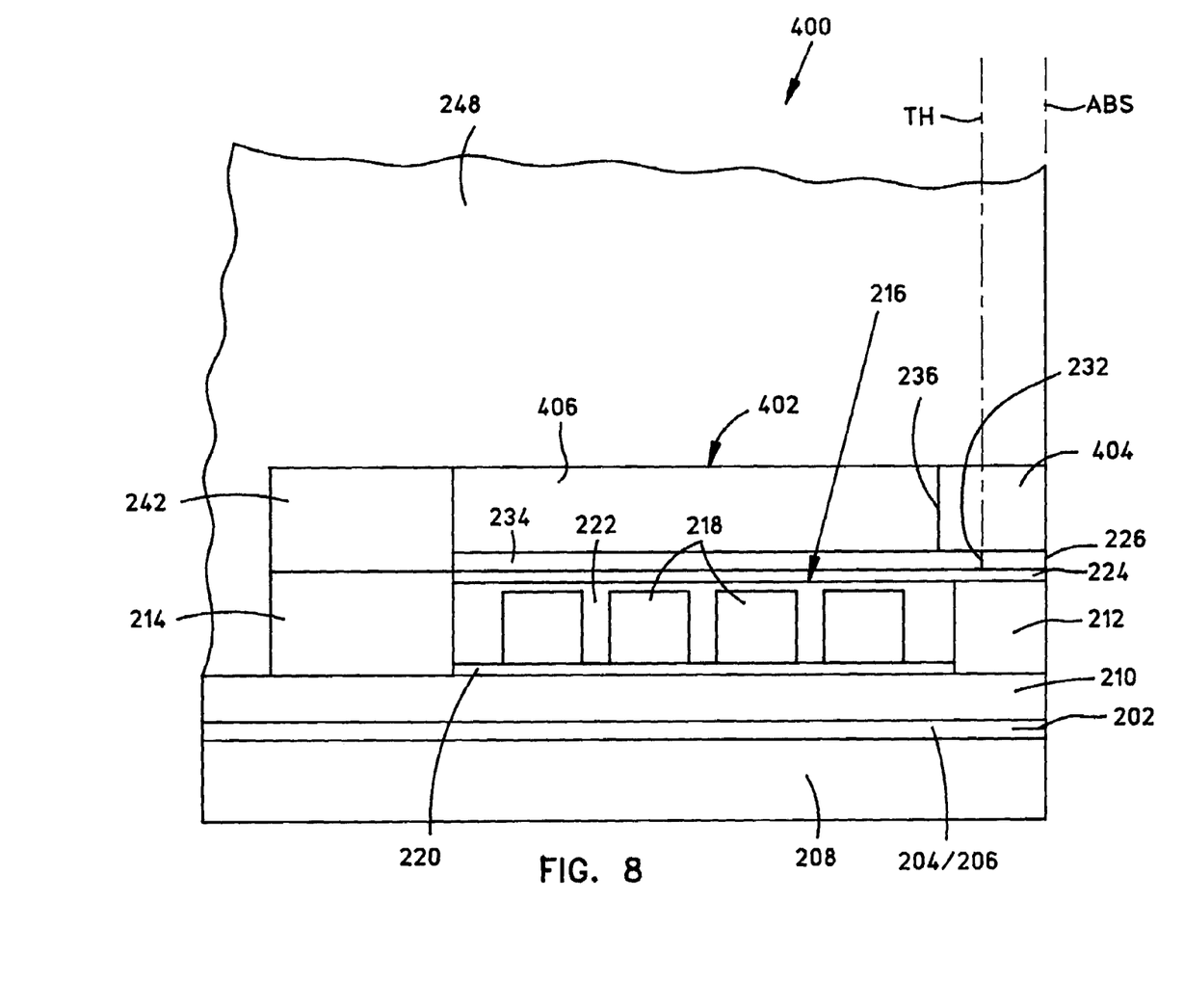
FIG. 8 is a longitudinal cross-sectional view through plane 8—8 of FIG. 2 of a third embodiment of the magnetic head assembly.

FIG. 8 illustrates a third embodiment 400 of the magnetic head assembly which differs from the embodiment 200 in FIG. 6A in that there is no third component of the second pole piece, the insulation stack 244 with the write coil therein is omitted and the second component 402 of the second pole piece is fabricated somewhat differently. The second component 402 is fabricated with a track width portion 404 which flares out at 236 to form a widened portion 406. The track width portion 404 is employed as a mask for ion milling the first component 226 with the desired track width or may be further ion milled to define the same track width in the write gap layer 224 and the pedestal 212 as shown in FIG. 6C.

Figure 9:
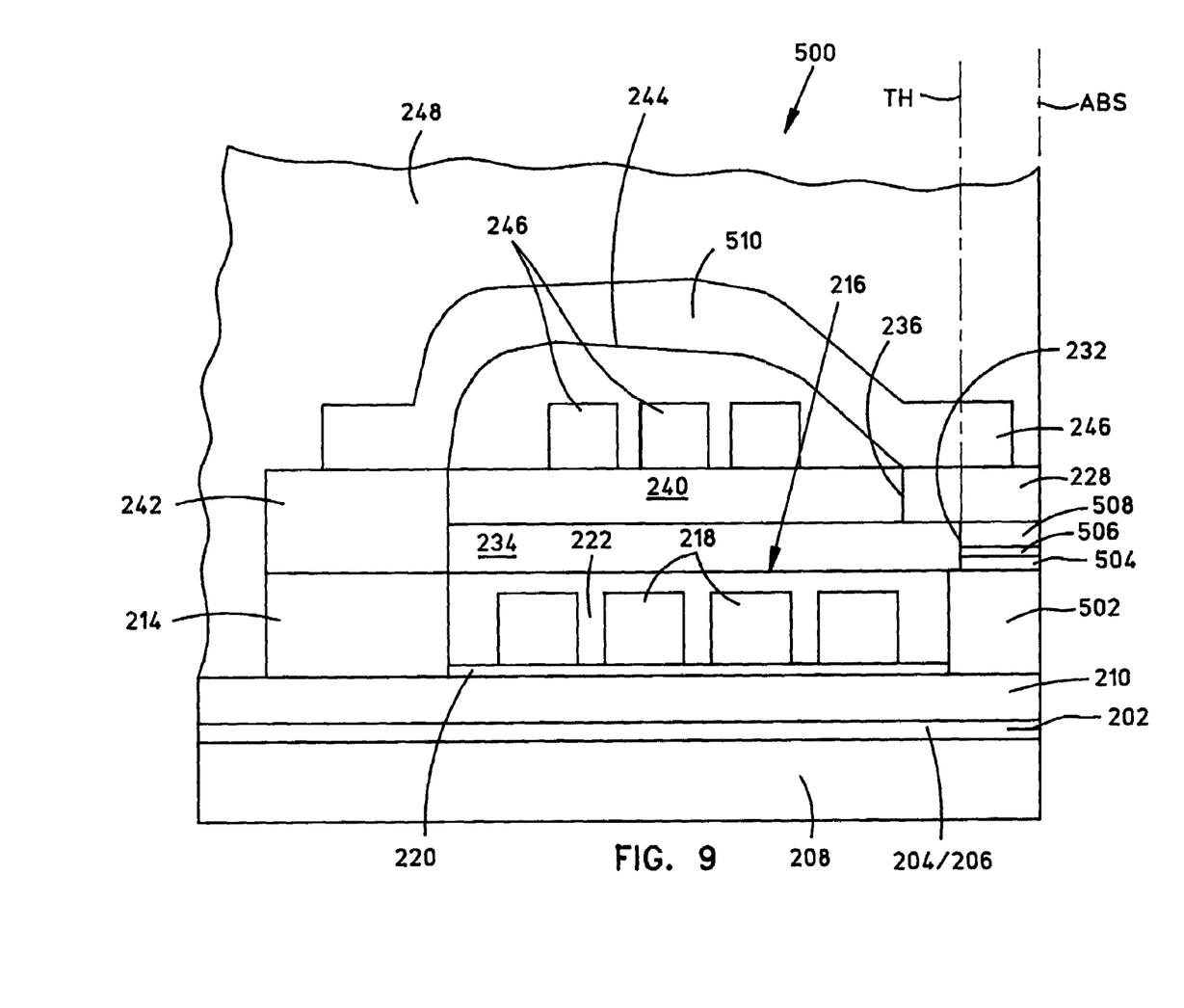
FIG. 9 is a longitudinal cross-sectional view through plane 9—9 of FIG. 2 of a fourth embodiment of the magnetic head assembly.

FIG. 9 illustrates a fourth embodiment of the magnetic head assembly which differs from the embodiment shown in FIG. 6A in that the pedestal 502 is not milled to form a cap. Instead a first pole piece cap 504 is formed on the pedestal 502, a write gap layer 506 is formed on the cap 504 and the first component 508 of the second pole piece is formed on the write gap 506 with these layers being flush at 232 to define the throat height. The second component 228 of the second pole piece along with other writer layers are constructed similarly as the embodiment shown in FIG. 6A–6C.

Figure 10:
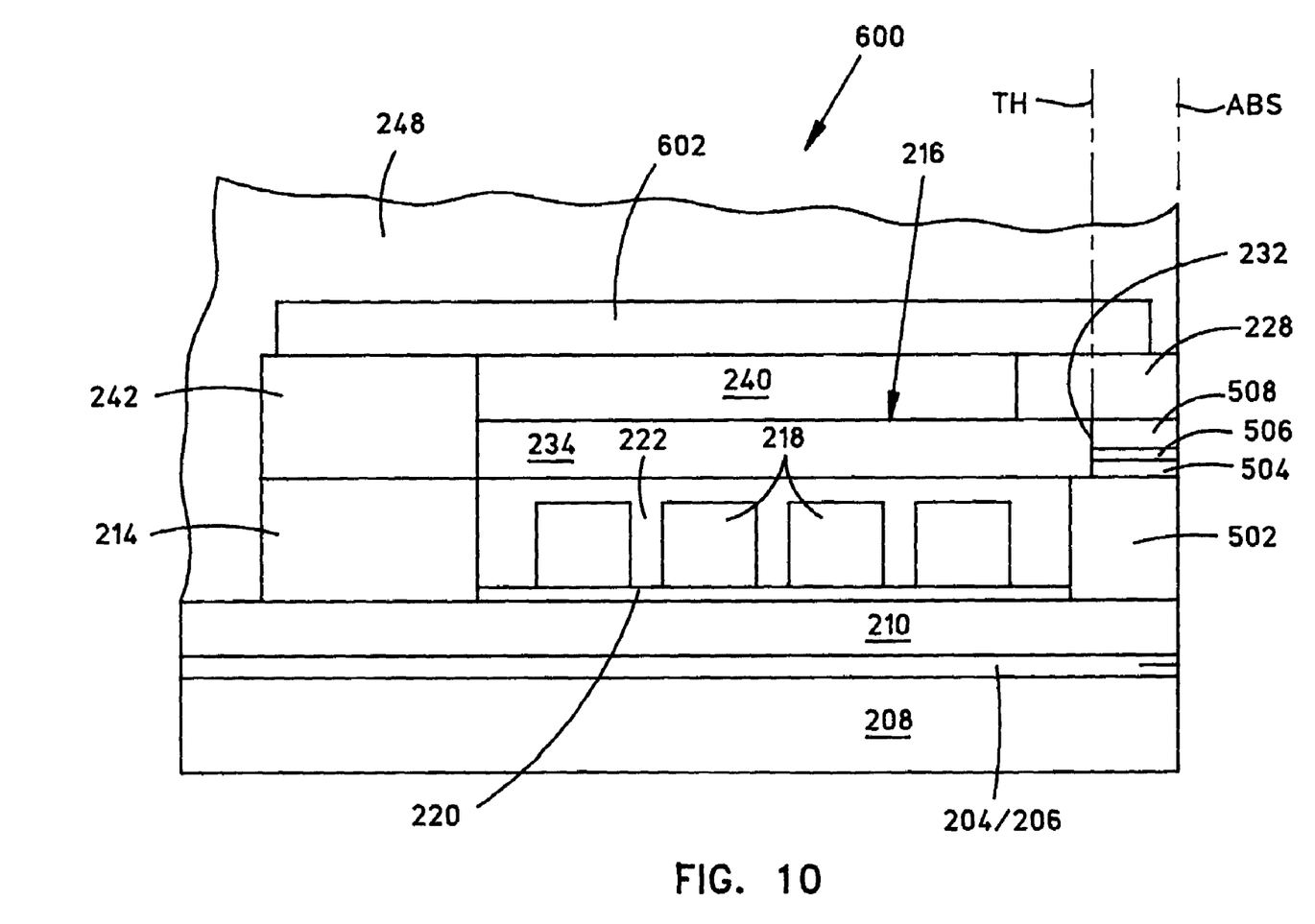
FIG. 10 is a longitudinal cross-sectional view through plane 10—10 of FIG. 2 of a fifth embodiment of the magnetic head assembly.

FIG. 10 shows an embodiment 600 which is the same as FIG. 9 except the second insulation stack 244 with the write coil embedded therein has been omitted and the third component of the second pole piece is a flat layer 602 which extends from near the ABS to the back gap 242.

Figure 11:
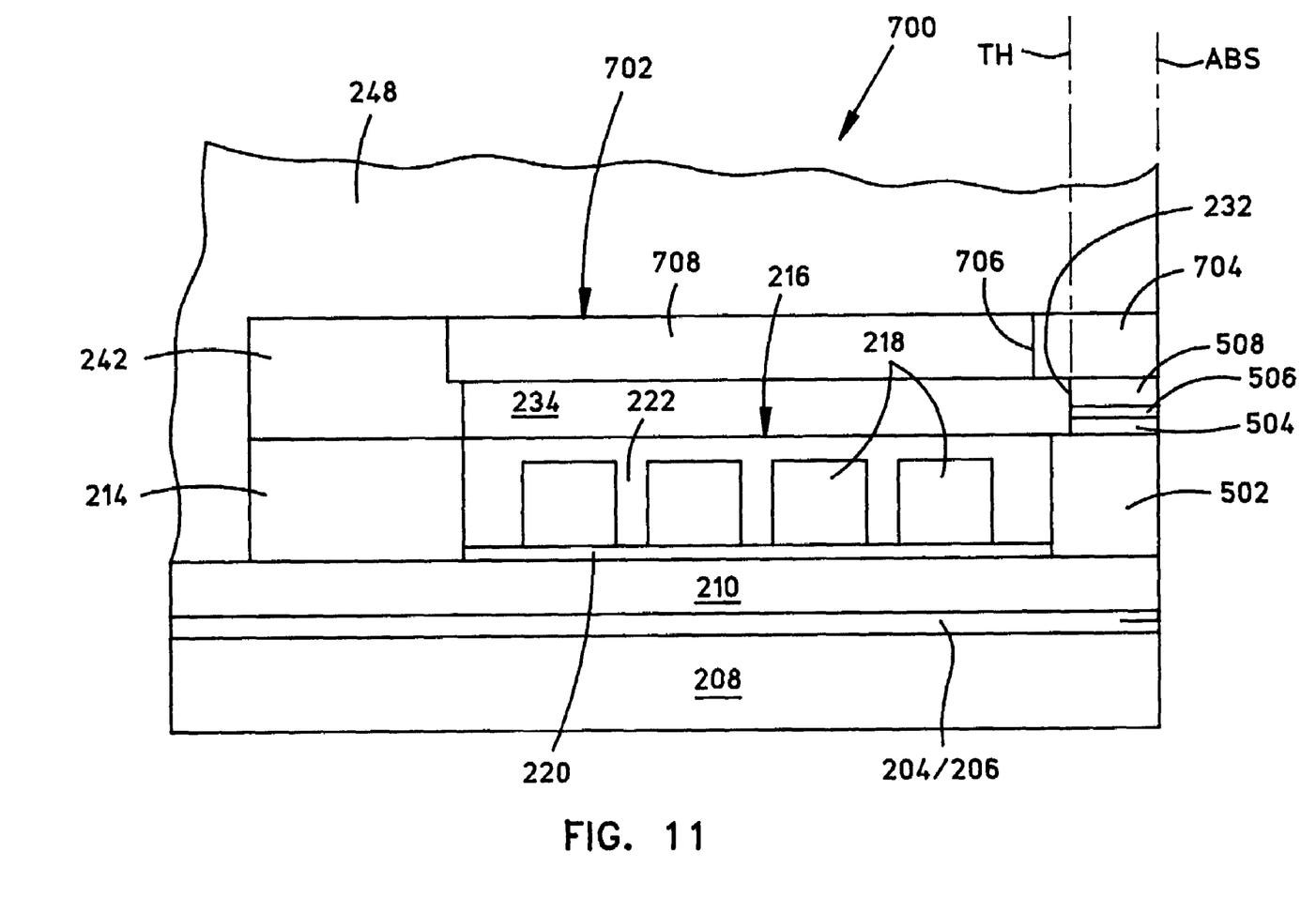
FIG. 11 is a longitudinal cross-sectional view through plane 11—11 of FIG. 2 of a sixth embodiment of the magnetic head assembly.

FIG. 11 illustrates a sixth embodiment 700 of a magnetic head assembly which is the same as the embodiment shown in FIG. 9 except a third component 702 of the second pole piece extends from the ABS to the back gap 242 and has a pole tip region 704 which defines the track width and flares out at 706 to a widened portion 708 from the pole tip to the back gap. The pole tip portion 704 with the desired track width may be employed as a mask for ion milling the track width into the layers 504, 506 and 508.

Discussion

It should be understood that all of the ferromagnetic layers may be fabricated by plating or sputter deposition. The photoresist can be positive or negative photoresist and may be bilayer where sputter deposition is employed. The insulation layers may be alumina and the insulation stacks may be either baked photoresist, alumina or other dielectric materials, such as SiO, SiN, etc. The back gap components may have various levels depending upon where the CMP is accomplished and may be different from that as shown in the foregoing figures. Further, the ABS may be referred to as a head surface so as to be inclusive of a head surface of a magnetic head assembly employed in a tape drive.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic write head assembly which has a yoke portion located between pole tip and back gap portions and a head surface at the pole tip portion, with the head surface having a track width and forming a first vertical plane comprising:
- first and second pole pieces;
- a write gap located between the first and second pole pieces;
- the second pole piece having first and second components wherein the first component is located between the write gap and the second component and each of the first and second components has a height into the head which extends from and which is oriented perpendicular to said head surface;
- the first component having a uniform thickness throughout its height into the head with the height into the head forming a zero throat (ZTH) which lies in a second vertical plane that is parallel to said first vertical plane;
- the height into the head of the second component being greater than the height into the head of the first component;
- each of the first and second components having said track width at the head surface;
- the first component and a first insulation layer forming a first horizontal plane that extends from the head surface entirely to the back gap in a direction that is perpendicular to the head surface; and
- the second component interfacing the first component and a first portion of the first insulation layer at said first horizontal plane with a second portion of the first insulation layer extending from the first component to the back gap.

2. A magnetic write head assembly as claimed in claim 1 wherein the second component is a flat layer in the pole tip, yoke and back gap portions and is magnetically connected to a back gap portion of the first pole piece layer.

3. A magnetic write head assembly as claimed in claim 2 further comprising:
- a first coil layer; and
- the first insulation layer being located entirely between the first coil layer and the second component of the second pole piece.

4. A magnetic write head assembly as claimed in claim 1 further comprising:
- a first coil layer; and
- the first insulation layer being located entirely between the first coil layer and the second component of the second pole piece.

5. A magnetic write head assembly as claimed in claim 4 further comprising:
- the second component and a second insulation layer forming a second horizontal plane between the head surface and the back gap in a direction that is perpendicular to the head surface;
- a second coil layer located directly on the second insulation layer at said second horizontal plane;
- the second pole piece having a seamless third component which is recessed from the head surface and is stitched to the second component and a back gap portion of the first pole piece; and
- the second coil layer being located between the second insulation layer and said seamless third component.

6. A magnetic disk drive comprising:
- at least one magnetic head assembly which has a yoke portion located between pole tip and back gap portions and a head surface at the pole tip portion, with the head surface having a track width and forming a first vertical plane;
- the magnetic head assembly having a write head and a read head with the write head being located on the read head;
- the read head including:
  - ferromagnetic first and second shield layers;
  - a read sensor located between the first and second shield layers;
  - the write head having a head surface and a track width at the head surface with the head surface forming a first vertical plane;
- the write head comprising:
  - first and second pole pieces;
  - a write gap located between the first and second pole pieces;
  - the second pole piece having first and second components wherein the first component is located between the write gap and the second component and each of the first and second components has a height into the head which extends from and which is oriented perpendicular to said head surface;
  - the first component having a uniform thickness throughout its height into the head with the height into the head forming a zero throat (ZTH) which lies in a second vertical plane that is parallel to said first vertical plane;
  - the height into the head of the second component being greater than the height into the head of the first component;
  - each of the first and second components having said track width at the head surface;
  - the first component and a first insulation layer forming a first horizontal plane that extends from the head surface entirely to the back gap in a direction that is perpendicular to the head surface; and
  - the second component interfacing the first component and the insulation layer at said second horizontal plane with a second portion of the first insulation layer extending from the first component to the back gap;
- a housing;
- a magnetic medium supported in the housing;
- a support mounted in the housing for supporting the magnetic head assembly with said head surface facing the magnetic medium so that the magnetic head assembly is in a transducing relationship with the magnetic medium;
- a motor for moving the magnetic medium; and
- a processor connected to the magnetic head assembly and to the motor for exchanging signals with the magnetic head assembly and for controlling movement of the magnetic medium.

* * * * *